US010511769B2

(12) United States Patent
Edpalm et al.

(10) Patent No.: US 10,511,769 B2
(45) Date of Patent: Dec. 17, 2019

(54) SYSTEM COMPRISING A VIDEO CAMERA AND A CLIENT DEVICE AND A METHOD PERFORMED BY THE SAME

(71) Applicant: Axis AB, Lund (SE)

(72) Inventors: Viktor Edpalm, Lund (SE); Song Yuan, Lund (SE); Alexandre Martins, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/980,392

(22) Filed: May 15, 2018

(65) Prior Publication Data

US 2018/0338084 A1 Nov. 22, 2018

(30) Foreign Application Priority Data

May 16, 2017 (EP) ..................................... 17171354

(51) Int. Cl.
*H04N 7/00* (2011.01)
*H04N 5/232* (2006.01)
*H04N 5/225* (2006.01)

(52) U.S. Cl.
CPC ....... *H04N 5/23238* (2013.01); *H04N 5/2258* (2013.01)

(58) Field of Classification Search
USPC .......................................................... 348/36
See application file for complete search history.

(56) References Cited

U.S. PATENT DOCUMENTS

| 2006/0088286 A1* | 4/2006 | Shibata ................ G11B 27/005 386/344 |
| 2008/0089405 A1 | 4/2008 | Cho et al. |
| 2011/0292233 A1 | 12/2011 | Chu et al. |

(Continued)

FOREIGN PATENT DOCUMENTS

JP 2011 211398 A 10/2011

OTHER PUBLICATIONS

"An Efficient Low Random-Access Delay Panorama-Based Multiview Video Coding Scheme"; Pourazad et al. IEEE, 16th IEEE International Conference on Image Processing (ICIP); pp. 2945-2948; Cairo, Egypt; ISBN: 978-1-4244-5654-3/09 (Nov. 7-10, 2009).

(Continued)

*Primary Examiner* — Behrooz M Senfi
(74) *Attorney, Agent, or Firm* — Volpe and Koenig, P.C.

(57) ABSTRACT

A system comprising a video camera and a client device and a method performed therein. The video camera captures a plurality of images concurrently using a plurality of image sensors having partly overlapping fields of views. Overlapping portions of the images are identified, and the images are joined to generate a panorama image. When joining the images, image data is included from only one of the images in overlapping portions, and image data from the other images in the overlapping portions is ignored. The panorama image and the ignored image data is encoded and transmitted to the client device in an encoded video stream. The client device decodes the video stream and, if the client device is customized, it updates the panorama image in portions corresponding to overlapping portions of the plurality of images using the image data that was ignored by the video camera when generating the panorama image.

14 Claims, 5 Drawing Sheets

(56) References Cited

U.S. PATENT DOCUMENTS

| | | | |
|---|---|---|---|
| 2012/0293607 A1* | 11/2012 | Bhogal | G06T 3/4038 |
| | | | 348/36 |
| 2012/0294549 A1* | 11/2012 | Doepke | G06T 3/4038 |
| | | | 382/294 |
| 2013/0141523 A1 | 6/2013 | Banta et al. | |
| 2016/0088287 A1* | 3/2016 | Sadi | H04N 13/254 |
| 2018/0027226 A1* | 1/2018 | Abbas | H04N 5/23238 |
| | | | 348/47 |
| 2018/0101934 A1* | 4/2018 | Cai | G06T 3/4038 |
| 2018/0205889 A1* | 7/2018 | Abbas | H04N 5/265 |
| 2018/0367789 A1* | 12/2018 | Henningsson | H04N 5/2622 |

OTHER PUBLICATIONS

EP 17171354.8 European Search Report (dated Nov. 15, 2017).

\* cited by examiner

SYSTEM COMPRISING A VIDEO CAMERA AND A CLIENT DEVICE AND A METHOD PERFORMED BY THE SAME

FIELD OF INVENTION

The present teachings relate to the field multi-sensor video cameras. In particular, it relates to generating a panorama image from a plurality of images captured by a video camera using a plurality of image sensors having partly overlapping fields of view.

BACKGROUND

Multi-sensor video cameras having multiple image sensors mounted next to each other for monitoring a scene are becoming popular, e.g., for surveillance applications. Images captured from the multiple image sensors may be used for creating a panorama image of the scene. There are many processing steps involved in creating such a panorama image. The images from the image sensors often need to be transformed to reduce aberrations from the lenses, the overlap of the images from the neighboring image sensors need to be identified, and the overlapping parts often need to be processed in order to create a smooth stitching, or blending, of the images captured from image sensors mounted next to each other.

The creating of a panorama image, and, in particular, the processing carried out in order to achieve a smooth stitching, is hence quite processing demanding. Performing this image processing at a high pace, such as in a high frame rate multi-sensor monitoring camera, requires a lot of processing power. Since processing power typically is a limited resource in a video camera, it is therefore of interest to ease the processing requirements of a video camera when creating a panorama image.

SUMMARY

In view of the above, it is thus an object of the present teachings to ease the processing requirements of a video camera when creating a panorama image.

According to a first aspect, the above object is achieved by a method performed in a system comprising a video camera and a client device. The method comprising: the video camera capturing a plurality of images concurrently by using a plurality of image sensors having partly overlapping fields of view, the video camera identifying overlapping portions of the plurality of images as portions where at least two images of the plurality of images overlap, the video camera generating, by joining together portions of the plurality of images, a panorama image corresponding to a union of the fields of view of the plurality of image sensors, wherein, for each overlapping portion of the plurality of images, the video camera includes image data from one of the at least two images that overlap in the panorama image, and the video camera ignores image data from the other images among the at least two images that overlap, the video camera encoding the panorama image and the image data that was ignored when generating the panorama image, and transmitting them to the client device in an encoded video stream, the client device receiving and decoding the encoded video stream, and on a condition that the client device is customized for handling the image data that was ignored by the video camera when generating the panorama image, the client device updating the panorama image in portions corresponding to the overlapping portions of the plurality of images using the image data that was ignored by the video camera when generating the panorama image.

According to this method, part of the processing for generating the panorama image is left to the client. A simple panorama image is generated at the video camera by joining together portions of image data from the plurality of images. However, the part of the processing that is most processing intense, i.e., the process of blending image data in the overlapping image portions so as to achieve a smooth stitching of the plurality of images, or more advanced stitching techniques, is left to the client. In this way, the processing burden on the video camera is eased, and, instead, the monitoring camera may be able to handle higher frame rates of the video streams captured by the plurality of image sensors.

Still, a simple panorama image is generated and encoded at the camera side. In portions where images from neighboring image sensors overlap, image data from only one of the neighboring image sensors is used, and image data from the other neighboring image sensors is ignored when generating the panorama image at the camera. In order to give the client device the building blocks to perform more advanced stitching of the images from the plurality of image sensors, such as blending image data in the overlapping portions, the image data that was ignored when creating the panorama image at the video camera is also encoded and sent to the client.

For some client devices, the panorama image generated at the video camera is good enough for their purpose, or the processing power is simply too limited to be able to perform any advanced stitching processing. This may for example be the case if the client is implemented on a mobile device or a tablet which, for instance is used by a patrolling security guard. Such client devices, referred to herein as non-customized devices, may decode and display the panorama image generated at the video camera. More advanced clients, referred to herein as customized client devices, should however be able to benefit from the additional information and update the panorama image in the overlapping portions using the image data that was ignored by the video camera when generating the panorama image. In this way, a customized client device may improve upon the smoothness of the panorama image, i.e., make the transitions between the individual images more smooth and seamless, by, e.g., blending of image data from the plurality of images in the overlapping portions. Additionally, this allows a customized client device to choose how to perform the blending of image data. Different customized client devices may hence use different ways of blending the image data depending on their needs. By way of example, a customized client may be implemented on an advanced computer with large processing capabilities used in a surveillance center.

By a panorama image as used herein is generally meant an image that covers the combined view of the plurality of images. The panorama image is generated by joining together portions of the plurality of images corresponding to the partly overlapping fields of view of the image sensors. The resulting panorama thus corresponds to the union of, i.e., the combination of, the fields of view of the plurality of image sensors.

By the video camera ignoring image data when generating the panorama image is generally meant that the image data is not included in the panorama image.

By a client device being customized for handling the image data that was ignored by the video camera when generating the panorama image is generally meant a client device which is adapted to identify the ignored image data in the video stream, and use the ignored image data for updating the received panorama image.

The updating of the panorama image in the client may be performed by blending image data of the panorama image that was generated by the video camera in portions thereof corresponding to overlapping portions of the original images with the additionally received image data that was ignored by the video camera when generating the panorama image. In this way, the client device may stitch the original images together so as to create a smoother panorama image. By blending as used herein is generally meant that a weighted average is formed. In more detail, the client device may, for each portion of the panorama image that corresponds to an overlapping portion of the plurality of images, update the panorama image by calculating a weighted average of the panorama image and the image data that was ignored by the video camera for that overlapping portion. By stitching of a plurality of images as used herein is meant that that the plurality of images are combined into a single image, and that image data in overlapping portions of the plurality of images are combined, i.e., blended, in one way or the other so as to achieve a smooth transition between the plurality of images.

The weighted average is typically calculated pixel-by-pixel in the overlapping portions. The weights used when calculating the weighted average may be selected pixel-wise. Hence, the weights may vary throughout the overlapping portions. The weights may be selected or calculated in different ways. In some embodiments, the weights are calculated based on image data in the overlapping portions, whereas in other embodiments the weights are calculated independently of the image data in the overlapping portions.

As an example of the latter case, the weights of the weighted average are selected pixel-wise based on a proximity of a pixel to a periphery of the portion of the panorama image that corresponds to an overlapping portion of the plurality of images. This will give rise to a smooth stitching of the original images. For example, suppose that images of two neighboring sensors overlap and that image data from a first of the two sensors is included in the panorama image in a portion thereof corresponding to the overlap, and that image data of the other of the two sensors in the overlap is sent to the client device in addition to the panorama image. A weight of image data originating from the first sensor may be a decreasing function of distance from the pixel to a boundary between the overlapping portion and a non-overlapping portion of the image from the first sensor. Likewise, a weight of image data originating from the second sensor may be a decreasing function of distance from the pixel to a boundary between the overlapping portion and a non-overlapping portion of the image from the second sensor. The weights may be normalized to be in the interval [0,1], and the sum of the weights for a pixel may be equal to one. In that case, the blending may be referred to as alpha-blending.

In order to even further improving the smoothness of the stitching, the weights of the weighted average may be a smooth function of the proximity of the pixel to the periphery of the portion of the panorama image that corresponds to an overlapping portion of the plurality of images. By smooth function is meant that the function is continuous, and preferably also derivable.

According to further embodiments, low frequency contents of the image data in overlapping portions may be blended differently than high frequency contents of the image data. By low frequency contents is generally meant spatial frequencies of the image data being lower than a first threshold, and by high frequency contents is generally meant spatial frequencies of the image data being equal to or larger than a second threshold. The second threshold may be equal to the first threshold or larger than the first threshold.

Typically, the low frequency contents represent smooth variations in the image data, whereas the high frequency contents represent irregular variations in the image data, such as noise. As the low frequency contents affect the smoothness of the resulting panorama image more than the high frequency contents, it is therefore often more important to blend the low frequency contents than the high frequency. This may be achieved by using different blending strategies for high and low frequencies. More specifically, this may be achieved by, for each portion of the panorama image that corresponds to an overlapping portion of the plurality of images: the client device calculating a first weighted average of the panorama image and the image data that was ignored by the video camera for that overlapping portion, wherein the first weighted average is calculated with respect to spatial frequencies being lower than a first threshold, the client device calculating a second weighted average of the panorama image and the image data that was ignored by the video camera for that overlapping portion, wherein the second weighted average is calculated with respect to spatial frequencies being equal to or above a second threshold, the second threshold being larger than or equal to the first threshold, wherein the panorama image is updated in each portion corresponding to an overlapping portion of the plurality of images by merging the first weighted average and the second weighted average, and wherein weights used to calculate the first weighted average and the second weighted average are selected differently.

According to exemplary embodiments, the weights of the first weighted average are a smooth function of the proximity to the periphery of the portion of the panorama image that corresponds to the overlapping portion of the plurality of images, and wherein the weights of the second weighted average are either zero or one depending on the proximity to the periphery of the portion of the panorama image that corresponds to the overlapping portion of the plurality of images. This will thus give a smooth blending at low frequencies where it matters the most. For high frequencies, no blending takes place.

The plurality of images captured by the plurality of sensors are typically aligned. The alignment is made depending on calibration data resulting from a calibration process made to the plurality of sensors. The alignment is usually optimal for a certain distance from the video camera, but, due to parallax, the alignment is sub-optimal for other distances. As a result, it may happen that two neighboring image sensors depict an object in the scene (located at a distance from the video camera for which the alignment is sub-optimal) at different pixel positions in the overlapping portion. In such cases, it may be desirable to only use image data depicting the object from one of the image sensors in order to not have a duplicate of the object in the panorama image.

In more detail, the method may further comprise: the client device identifying objects in the portion of the panorama image that corresponds to an overlapping portion of the plurality of images and in the image data that was ignored by the video camera when generating that portion of the panorama image, wherein, if an object is identified in both the portion of the panorama image that corresponds to an overlapping portion of the plurality of images and in the image data that was ignored by the video camera when generating that portion of the panorama image, a weight of one of the panorama image and the image data that was ignored by the video camera when generating that portion is set to zero for pixels identified as belonging to that object.

It is to be understood that the identified object could be a part of an object, such as an object that is partly depicted in a portion of the panorama image that corresponds to an overlapping portion of the plurality of images and is partly depicted by the image data that was ignored by the video camera when generating that portion of the panorama image The client device may not only use the received data to update the panorama image in order to provide a smooth panorama image, but it may also use the received data for other purposes. For example, having image data depicting the same area of a scene captured by two different image sensors may be an advantage when doing forensic analysis of the video stream, such as when identifying a person present in the scene.

The client device may also use the received data to restore the plurality of images. This is possible since the proposed method is loss-less in the sense that, apart from the compression carried out by the encoder, no image data is discarded by the video encoder. Specifically, image data from non-overlapping portions and overlapping portions of all original images is represented in the data that is received at the client. Thus, the method may further comprise: the client device restoring the plurality of images from the panorama image and the image data that was ignored when generating the panorama image.

According to further embodiments, the client device may use the received data to derive depth information with respect to objects in the scene. This is possible due to the parallax of the plurality of image sensors. In more detail, the client device may calculate, based on the panorama image and the image data that was ignored by the video camera when generating the panorama image, depth information for portions of the panorama image corresponding to the overlapping portions of the plurality of images.

As further mentioned above, all client devices may not be customized to carry out blending or more advanced stitching procedures. Such client devices may simply decode and display the received panorama image, and ignore any additional data corresponding to the image data that was ignored by the video camera when generating the panorama image. More specifically, on a condition that the client device is not customized for handling the image data that was ignored by the video camera when generating the panorama image, the client device may display the panorama image.

As further mentioned above, the panorama image and the additional information in the form of image data from overlapping portions of the plurality of images that was ignored by the video camera when generating the panorama image are encoded and transmitted in an encoded video stream to the client device. Since the encoded video stream may be received by different types of client devices, which may or may not be customized for handling the image data that was ignored by the video camera when generating the panorama image, it is advantageous that the transmittal of the additional information is flexible so that non-customized devices still can decode and display the received video stream according to the present video decoding standards.

In order to achieve this, the panorama image may be encoded as a video frame of a video stream using standard video encoding schemes. The additional information, i.e., the image data from the overlapping portions that is not included in the panorama image, may be encoded as an additional encoding item which is linked to the encoded video stream by using time stamp information. In more detail, the panorama image may be encoded as a video frame marked by a time stamp in the encoded video stream, and the video camera may mark the encoded image data that was ignored when generating the panorama image by the same time stamp.

According to embodiments, the image data that was ignored when generating the panorama image is encoded as additional encoding tiles and/or slices in the same video frame as the panorama image. In this way, the additional information is included in the same video frame as the panorama image. However, a non-customized device may ignore the additional encoding tiles and/or slices, e.g., by indicating the additional encoding tiles and/or slices as "non-display", or by including the additional slices and/or tiles in the data of the frame but using a header of the frame which does not indicate the presence of the additional slices and/or tiles.

Alternatively, the image data that was ignored when generating the panorama image may be encoded as one or more separate video frames. In more detail, the image data in the overlapping portions that was ignored when generating the panorama image may be encoded as separate video frames, which are additional to the video frame comprising the panorama image. In the separate video frames, the ignored image data is typically located at the corresponding pixel positions as in the panorama image. The remaining pixel positions may be encoded as skip blocks. A standard video decoder of a non-customized client device could then simply not display the additional frames, while a customized decoder of a client device would be instructed to identify theses video frames and use them for updating the panorama image.

The one or more separate video frames may be marked as non-display frames. In this way, a standard decoder of a customized device implementing a standard for which non-display frames are available would easily be able to ignore the additional information of the separate video frames. For video decoding standards where non-display frames cannot be used, the one or more separate video frames may instead be marked with a display count value referring to an earlier or a later position in the video stream so as to trick the standard decoder to not display the separate video frames.

According to a second aspect, the above object is achieved by a system comprising: a video camera comprising a plurality of image sensors having partly overlapping fields of view, the plurality of image sensors being configured to concurrently capture a plurality of images, wherein the video camera is further configured to: identify overlapping portions of the plurality of images as portions where at least two images of the plurality of images overlap, generate, by joining together portions of the plurality of images, a panorama image corresponding to a union of the fields of view of the plurality of image sensors, wherein, for each overlapping portion of the plurality of images, the video camera is configured to include image data from one of the at least two images that overlap in the panorama image, and to ignore image data from the other images among the at least two images that overlap, and encode the panorama image and the image data that was ignored when generating the panorama image, and transmitting them to a client device in an encoded video stream, the system further comprising: a client device which is configured to receive and decode the encoded video stream, and to update the panorama image in portions corresponding to the overlapping portions of the plurality of images using the image data that was ignored by the video camera when generating the panorama image.

The second aspect may generally have the same features and advantages as the first aspect. It is further noted that the present teachings relate to all possible combinations of features unless explicitly stated otherwise. The steps of any method disclosed herein do not have to be performed in the exact order disclosed, unless explicitly stated.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments are shown. The systems and devices disclosed herein will be described during operation.

Figure 1:
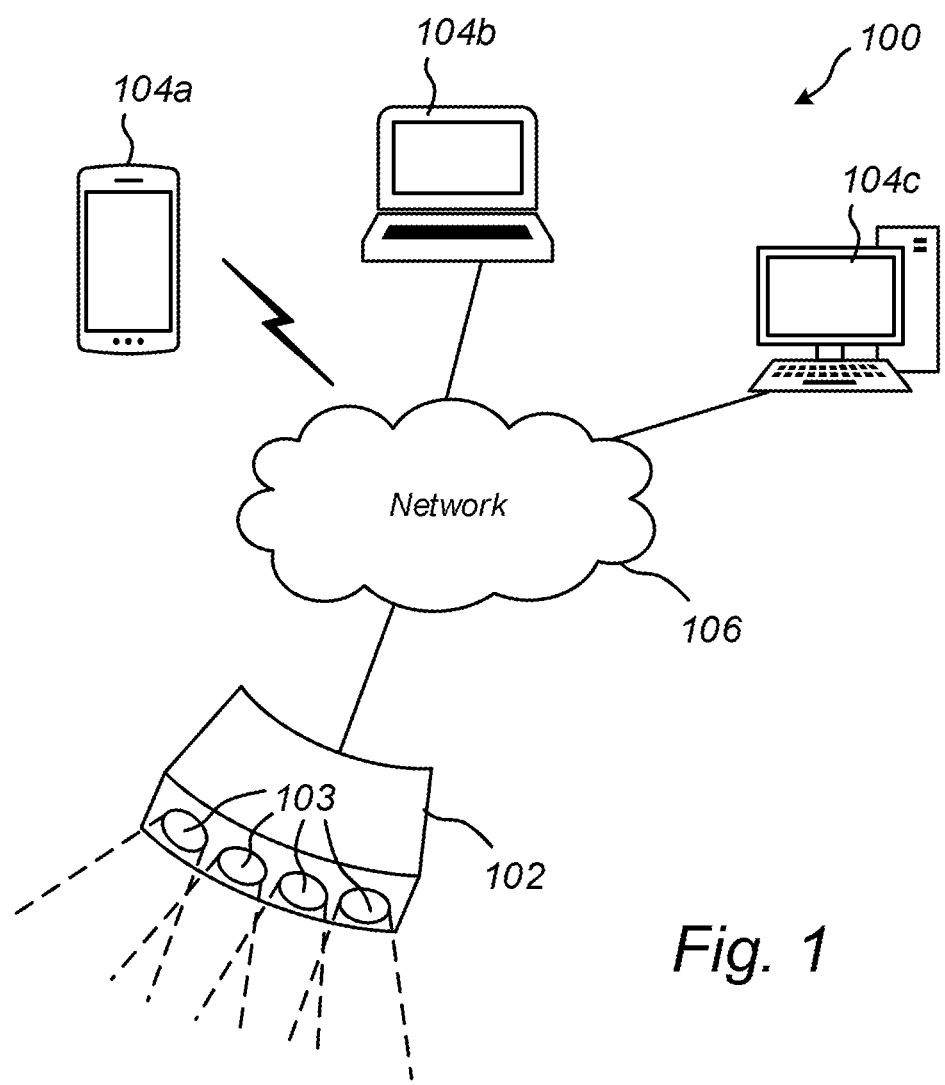
FIG. 1 schematically illustrates a system according to embodiments.

FIG. 1 illustrates a system 100 comprising a video camera 102 having a plurality of image sensors 103, and one or more client devices 104a, 104b, 104c. The video camera 102 may be a visual light camera, a thermal camera or a time of flight, ToF, camera. The video camera 102 is arranged to communicate with the one or more client devices, e.g., via a network 106. The communication may be via wire or wireless.

The one or more client devices 104a, 104b, 104c may be of various types. In the illustrated example, client device 104a is a mobile device, client device 104b is a laptop, and client device 104c is a computer. The client devices 104a, 104b, 104c may be used for different purposes and may also have different processing capabilities. For example, on the one hand, the client device 104a, which is a mobile device, may be used by a patrolling security guard who, via the mobile device, may view a panorama image which is generated by the video camera 102. In view of the limited processing capability of a mobile device, the client device 104a may not be able to perform any further processing of the received panorama image. At the same time, in view of the small screen of the mobile device, and the situation in which it is used, the panorama image received from the video camera 102 may be good enough for the purpose of giving the security guard an overview of the view captured by the sensors 103 of the video camera 102. On the other hand, the computer 104c may be an advanced computer in a surveillance center. As such, it may have large processing capabilities, at least compared to the mobile client device 104a. The client device 104c may be customized to process a panorama image received from the video camera 102 in order to, for instance, make the transitions between the images used to generate the panorama image smoother. As a result, an improved panorama image of higher quality may be displayed to the operators in the surveillance center.

In the following, client devices that are adapted to decode additional information in the received bit stream corresponding to image data in overlapping portions of the plurality of images that was ignored at the camera side, and process the received panorama image based on the additional information are referred to as customized client devices. In contrast, client devices that are not adapted to decode the additional information or process a received panorama image are referred to as non-customized client devices. In the above example, client device 104a is thus a non-customized client device and client device 104c is a customized client device.

The plurality of sensors 103 of the video camera 102 have partly overlapping fields of view. This is further illustrated in FIG. 2 which shows a plurality of images A, B, C, D being captured concurrently, i.e., at the same time, by the plurality of sensors 103 of the video camera 102. Each of the images A, B, C, D, thus corresponds to a different one of the image sensors 103. In this case four sensors 103 and four images are depicted, although it is understood that the number of sensors may be any number larger or equal to two. In the illustrated example, the image sensors are mounted next to each other in a one-dimensional array. However, it is to be understood that the image sensors may be mounted in other array-like patterns, such as being mounted on a two-dimensional array or being mounted on a sphere.

Due to the fields of view of the sensors being overlapping, the images A, B, C, D overlap each other. In other words, there are overlapping portions in the plurality of images, as indicated by the dashed areas in FIG. 2.

Figure 3:
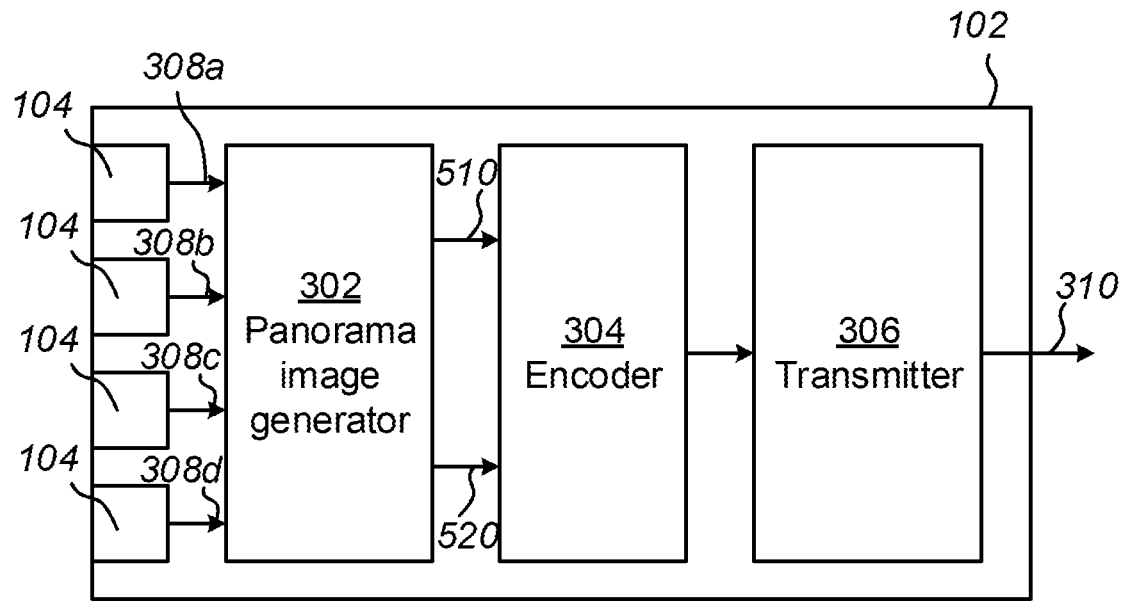
FIG. 3 schematically illustrates internal components of a video camera according to embodiments.

FIG. 3 illustrates internal components of the video camera 102. The video camera 102 includes a plurality of sensors 103, a panorama image generator 302, an encoder 304, and a transmitter 306.

Figure 4:
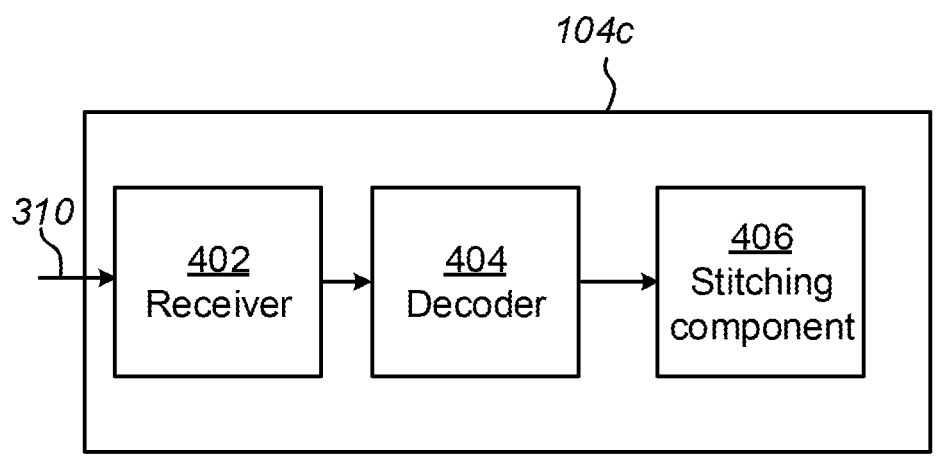
FIG. 4 schematically illustrates internal components of a client device according to embodiments.

FIG. 4 illustrates internal components of a customized client device 104c. The client device 104c comprises a receiver 402, a decoder 404, and a stitching component 406. The client device 104c may also include a display. A non-customized client typically includes a receiver, and a decoder. However, the non-customized client does typically not include a stitching component.

The video camera 102 thus comprises various components 302, 304, and 306 which are configured to implement the functionality of the video camera 102. Similarly, the client device 104c comprises various components 402, 404, 406 which are configured to implement the functionality of the client device 104c. In particular, each illustrated component corresponds to a functionality of the video camera 102 or the client device 104c. Generally, the video camera 102 and the client device 104c may comprise circuitry which is configured to implement the components 302, 304, 306, 402, 404, 406, and, more specifically, their functionality.

In a hardware implementation, each of the components 302, 304, 306, 402, 404, 406 may correspond to circuitry which is dedicated and specifically designed to provide the functionality of the component. The circuitry may be in the form of one or more integrated circuits, such as one or more application specific integrated circuits. By way of example, the panorama image generator 302 may thus comprise circuitry which, when in use, generates a panorama image.

In a software implementation, the circuitry may instead be in the form of a processor, such as a microprocessor or a central processing unit, which in association with computer code instructions stored on a (non-transitory) computer-readable medium, such as a non-volatile memory, causes the video camera 102 and the client device 104c to carry out any method disclosed herein. In that case, the components 302, 304, 306 may thus each correspond to a portion of computer code instructions stored on the computer-readable medium in the video camera 102, that, when executed by the processor in the video camera, causes the video camera 102 to carry out the functionality of the component. Similarly, the components 402, 404, 406 may thus each correspond to a portion of computer code instructions stored on the computer-readable medium in the client device 104c, that, when executed by the processor in the client device 104c, causes the client device 104c to carry out the functionality of the component.

It is to be understood that it is also possible to have a combination of a hardware and a software implementation, meaning that the functionality of some of the components 302, 304, 306, 402, 404, 406 are implemented in hardware and others in software.

Figure 7:
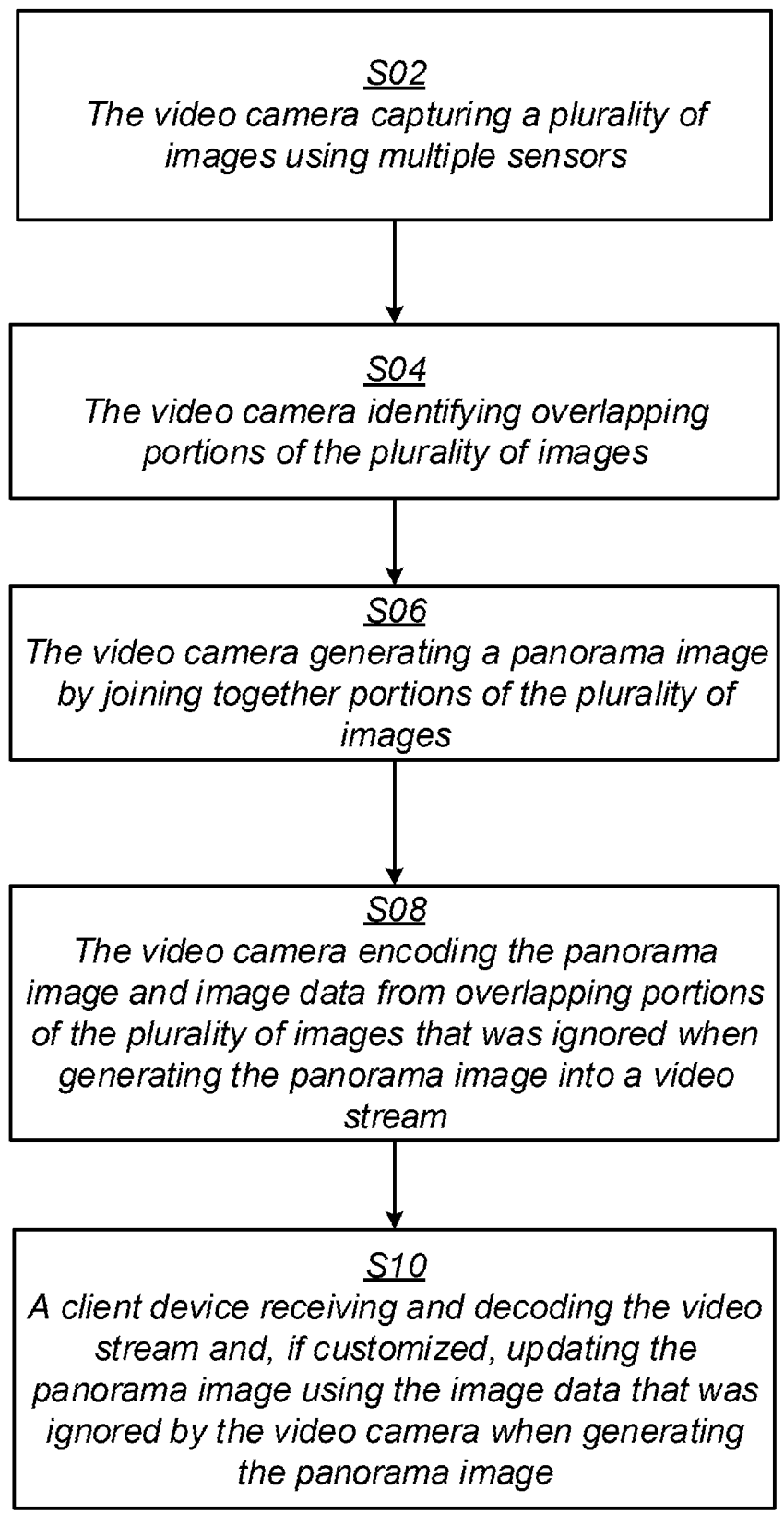
FIG. 7 is a flow chart of a method according to embodiments.

The operation of the system 100 including the video camera 102 and the client devices 104a, 104b, 104c will be explained in connection to FIGS. 1, 2, 3, 4, 5, and the flow chart of FIG. 7.

In step S02, the video camera 102 captures a plurality of images A, B, C, D, using the plurality of image sensors 103. In more detail, the plurality of sensors 103 are each configured to capture a video stream 308a, 308b, 308c, 308d of a scene. Each video stream is a sequence of images arranged in video frames. The plurality of image sensors 103 are synchronized such that they capture images at the same time. Each frame of the video stream 308a captured by a first sensor thus has a corresponding frame in each of the video streams 308b, 308c, 308d captured by the other image sensors. The images A, B, C, D corresponds to frames of the video streams 308a, 308b, 308c, 308d being captured at the same time by the image sensors 104.

The video streams 308a, 308b, 308c, and 308d are input to the panorama image generator 302. As frames of the video streams 308a, 308b, 308c, 308d arrive at the panorama image generator 302, the panorama image generator 302 may transform and align the plurality of images A, B, C, D shown in FIG. 2, corresponding to the simultaneously received frames of the video streams 308a, 308b, 308c, 308d. The transformation and alignment is made to compensate for aberrations from the lenses that image the scene onto the image sensors 103, sometimes referred to as barrel distortion correction, and to project the plurality of images onto a common surface so as to compensate for the fact that the plurality of images are not taken from a single position. This kind of transformation and alignment is known in the art. In more detail, the image sensors 103 are not mounted in the same physical position and are also typically mounted to look in different directions. Since it is desirable that the resulting panorama image looks as if it were taken from a single position rather than from positions which are offset from each other, the plurality of images are transformed so as to be projected onto a common surface, such as a cylinder or a sphere. The transformation and alignment made will be different for different sensors. However, the same transformation and alignment is typically made for each frame originating from the same image sensor 103. The transformation and alignment to be applied may be determined from a calibration of the image sensors 103, and the determined transformation and alignment may then be used for all future frames.

Figure 2:
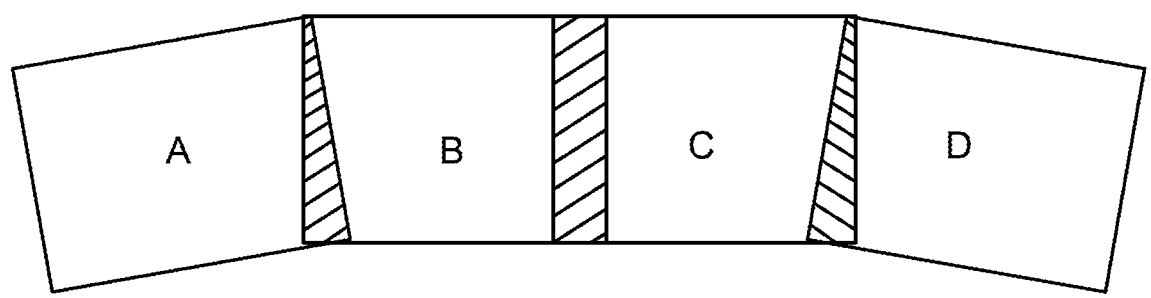
FIG. 2 schematically illustrates images captured by a multi-sensor camera.
Figure 5:
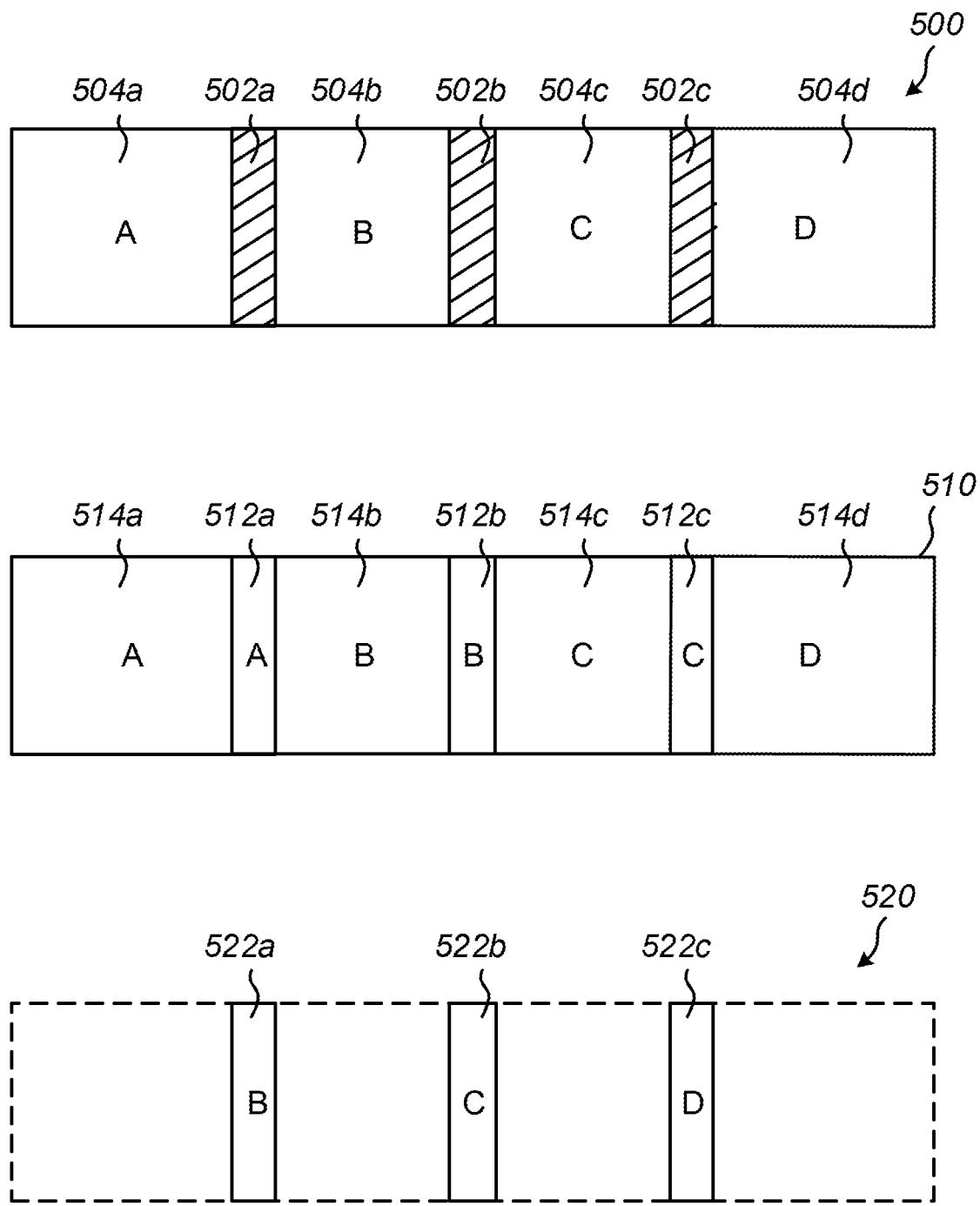
FIG. 5 schematically illustrates transformed and aligned images captured by a multi-sensor video camera, a panorama image generated by the video camera, and image data that is ignored by the video camera when generating the panorama image in accordance with embodiments.

The images A, B, C, D after transformation and alignment are illustrated as item 500 in FIG. 5. The images A, B, C, D have overlapping portions 502a, 502b, 502c. For the sake of illustration, the overlapping portions 502a, 502b, 502c are shown as having a rectangular shape. However, it is to be understood that the overlapping portions, due to the alignment and transformation typically has a non-rectangular shape. The below description applies equally well to overlapping portions having a non-rectangular shape. Further, it is to be understood that the transformation and alignment typically renders the periphery of the image A, B, C, D non-rectangular. Therefore, cropping may be applied to the images A, B, C, D so as to restore a rectangular shape 500 as illustrated in FIG. 5. This may sometimes be complemented by filling in "holes" in the rectangular image, i.e., pixels inside the rectangular shape 500 having no values, by black pixels (pixels with the value zero). In each overlapping portion 502a, 502b, 502c, at least two of the plurality of images A, B, C, D overlap. This means that, for each overlapping portion 502a, 502b, 502c there is image data available from at least two images. In this example, there is image data available from image A and image B in the overlapping portion 502a, from image B and image C in the overlapping portion 502b, and from image C and image D in the overlapping portion 502c. In non-overlapping portions 504a, 504b, 504c and 504d, image data from only one of the images is available, in this case from image A in portion 504a, from image B in the portion 504b, from image C in portion 504c, and from image D in portion 504d. Due to the transformation and alignment, the shape of the overlapping portions 502a, 502b, 502c has changed compared to what is shown in FIG. 2.

The panorama image generator 302 then, in step S04, proceeds to identify overlapping portions 502a, 502b, 502c in the plurality of images A, B, C, D. The overlapping portions 502a, 502b, 502c may be identified by using image processing which matches the images, e.g., by performing image correlation, or by identifying and matching features in the plurality of images. However, once the initial calibration of the image sensors 103 is made, the overlapping portions will be the same in all future frames. It is therefore possible to identify the overlapping portions 502a, 502b, 502c based on calibration data from the calibration of the image sensors 103. The identification may be based on calibration data only, or image processing may be used in addition in order to fine-tune the identification stemming from the calibration data. Step S04 may also comprise identification of non-overlapping portions 504a, 504b, 504c, and 504d.

In step S06, the panorama image generator 302 of the video camera 100 generates a panorama image. The panorama image is generated by joining selected portions of the plurality of images A, B, C, D together, i.e., by arranging the selected portions of the plurality of images A, B, C, D side by side to form a panorama image. In particular, the non-overlapping portions 504a, 504b, 504c, 504d of all images A, B, C, D are joined together with overlapping portions from some of the images A, B, C, D. However, in order to save processing power, no blending of image data takes place in the video camera 100. This is further illustrated in FIG. 5 which shows a panorama image 510. The panorama image 510 represents the union of the fields of view of the plurality of image sensors 103. The panorama image 510 comprises portions 514a, 514b, 514c and 514d corresponding to the non-overlapping portions 504a, 504b, 504c and 504d of the plurality of images A, B, C, D. The panorama image 510 also comprises portions 512a, 512b, 512c corresponding to the overlapping portions 502a, 502b, 502c of the plurality of images A, B, C, D.

As previously described, image data is available from a single one of the images A, B, C, D in each non-overlapping portion 504a, 504b, 504c and 504d. Therefore, in each corresponding portion 514a, 514b, 514c and 514d of the panorama image 510, the panorama image generator 302 includes image data from that single image. In this case, the panorama image generator 302 includes image data from image A in portion 514a, image data from image B in portion 514b, image data from image C in portion 514c, and image data from image D in portion 514d.

For the overlapping portions 502a, 502b, 502c, image data is available from several of the images A, B, C, D. In this example, image data from two images is available in each overlapping portion. For the corresponding portions 512a, 512b, 512c of the panorama image 510, the panorama image generator 302 includes image data from only one of the images A, B, C, D for which image data is available. The panorama image generator 302 thus selects one image for each overlapping portion and includes image data from the selected image in the corresponding portion of the panorama image 510. In the illustrated example, the panorama image generator 302 includes image data from image A in portion 512a of the panorama image 510, image data from image B in portion 512b, and image data from image C in portion 512c. Thus, in order to generate the panorama image 510, the panorama image generator 302 in this example joins together the non-overlapping portions of images A, B, C, D, and the overlapping portions of images A, B, C. Thus, when at least two of the images A, B, C, D overlap, only one of the images is selected for the corresponding overlapping portion, and is joined together with the non-overlapping portions of the images. If two or more images overlap, any one of them can be selected for the corresponding overlapping portion. When generating the portions 512a, 512b, 512c of the panorama image 510, the panorama image generator 302 thus ignores image data from all but the selected image. In this case, image data from image B is ignored when generating portion 512a, image data from image C is ignored when generating portion 512b, and image data from image D is ignored when generating portion 512c. The image data that was ignored by the panorama image generator 302 when generating the panorama image 510 is illustrated as item 520 in FIG. 5. The items 522a, 522b, and 522c corresponds to image data that was ignored by the panorama image generator 302 when generating portions 512a, 512b, and 512c of the panorama image, respectively.

Even if the panorama image generator 302, ignores some image data when generating the panorama image 510, the panorama image generator 302 does not discard the ignored image data. On the contrary, and as shown in FIG. 3, the panorama image generator 302 forwards the panorama image 510 and the ignored image data 520 to the encoder 304. The ignored image data 520 is forwarded together with position information, e.g., in the form of image coordinates, which identifies the corresponding portions 512a, 512b, 512c of the panorama image 510.

It is to be understood that, as new frames of the video streams 308a, 308b, 308c, 308d arrives at the panorama image generator 302, the above steps are repeated. Hence, a stream of panorama images 510 and a stream of ignored image data 520 are sequentially forwarded to the encoder 304.

As the encoder 304 sequentially receives panorama images 510 and ignored image data 520, it proceeds, in step S08, to encode the panorama images 510 and the ignored image data 520. The encoder 304 may generally encode the stream of panorama images 510 as video frames of a video stream using standard video encoding schemes, such as H.264 or H.265. The encoder 304 further encodes the ignored image data 520 as one or more additional encoding items and links them to the encoded video stream by means of time stamps. For example, the panorama image 510 of FIG. 5 may be encoded as a video frame marked by a time stamp in the video stream. The corresponding encoded ignored image data 520 may be marked by the same time stamp. In this way, a decoder may associate the ignored image data 520 with the correct panorama image 510.

There are different alternatives for how to generate the additional encoding items, i.e., the ignored image data 520 may be encoded in different ways. According to one embodiment, the ignored image data 520 is encoded in the same video frame as the panorama image 510. In more detail, the ignored image data 520 may be encoded as additional encoding tiles and/or slices at the corresponding positions of the panorama image 510. By way of example, the ignored image data 522a may be encoded as additional tiles and/or slices at the positions corresponding to portion 512a of the panorama image 510.

A video frame may generally comprise a frame header which is followed by frame data, in this case encoded image data. An image to be encoded may be divided into horizontal partitions, called slices. Additionally, or alternatively, an image to be encoded may be divided into vertical partitions, called tiles. The slices and/or tiles may be encoded and decoded separately, but may still be included in the same video frame. Slices may therefore be considered as horizontally independently coded and decodable units of a frame, and tiles may be considered as vertically independently coded and decodable units of the frame. Slices are, e.g., supported by the H.264 and H.265 standards. Tiles (and slices) are, e.g., supported by the H.265 standard. In order for a decoder to separate the different slices and/or tiles from each other, a start code and a stop code may be used to identify the start and stop of a slice or a tile in the frame data. For example, assume that a video frame includes two tiles, tile 1 and tile 2, then it may have the form:

Frame header
Start code
Tile 1
Stop code
Start code
Tile 2
Stop code

In order for a decoder to correctly compose an image from an encoded video frame, it also needs to know the position of the different tiles or slices, e.g., in terms of pixel positions, in the image. In other words, in addition to transmitting the encoded tiles or slices, the frame also carries positional information for the encoded tiles or slices. Such positional information may, e.g., be comprised in the start code.

Returning to the example of FIG. 5, there are several ways of partitioning the panorama image 510 into tiles. For example, the panorama image 510 could be encoded as a single tile. According to another example, portions 514a, 512a originating from image A could be encoded as a first tile, portions 514b, 512b originating from image B could be encoded as a second tile, portions 514c, 512c originating from image C could be encoded as a third tile, and portion 514d originating from image D could be encoded as a fourth tile. These four tiles could be indicated by start and stop codes in the video frame as explained above.

In addition, the ignored image data 522a, 522b, 522c, may be encoded in the same frame. For example, the ignored image data 522a may be encoded as a first additional tile, the ignored image data 522b may be encoded as a second additional tile, and the ignored image data 522c may be encoded as a third additional tile which are added at the end of the frame data, i.e., after the tiles which represents the panorama image 510. Alternatively, the ignored image data 522a, 522b, 522c may be encoded in a single additional tile, corresponding to the dashed outline of item 520 in FIG. 5 (which in turn corresponds to the outline of the panorama image 510).

The additional tiles are only intended to be read by a customized decoder and should therefore be encoded in a manner allowing a non-customized decoder to disregard the additional tiles and still be able to decode the video frame so as to decode the panorama image 510. This may be achieved in several ways. In a first way, the additional tiles may be indicated by start and stop codes as described above. In that case, the start code(s) may carry the positional information of the additional tiles, e.g., to indicate that the ignored image data 522a corresponds to the position of the overlapping portion 512a, and similar for the ignored image data 522b, and 522c. Further, the additional tiles may be marked as "non-display" in the frame header. This allows a non-customized decoder to disregard the additional tiles, since tiles marked as "non-display" are only decoded if referred to by another tile or frame, which is not the case here. According to a second, alternative, way, the additional tiles may be included in the frame without using any start and stop codes. A non-customized decoder will in that way disregard the additional tiles, since it is searching for start codes in order to read in data. A customized decoder may however read all data in the frame, even if not indicated by start and stop codes. In this case, the positional information of the additional tiles need to be conveyed in another manner than in the start code, e.g., in the frame header.

The above has mainly been described with respect to tiles, although it applies equally well to slices. Tiles are preferably used when the image sensors are horizontally arranged, and slices are preferably used when the image sensors are vertically arranged.

In cases where an overlapping portion is non-rectangular in shape, a slice/tile that includes the whole non-rectangular overlapping portion may be created, and the areas of the slice/tile having no pixel information from the overlapping portion are encoded with skip blocks in accordance with what is described below.

According to another embodiment, the ignored image data 520 is encoded in one or more additional video frames in the encoded video stream, i.e., in video frames that are separate from the frame carrying the corresponding panorama image 510. For example, the one or more additional frames may comprise the ignored image data 520 located at the corresponding position as in the panorama image 510 and skip blocks. In more detail, in order to encode the separate frame, an "alternative" panorama image could be generated. Referring to the FIG. 5 example, the alternative panorama image has the same image contents as the panorama image 510 in the non-overlapping portions 514a, 514b, 514c, 514d. However, in the overlapping portions 512a, 512b, 512c, the image data is replaced by the ignored image data 522a, 522b, 522c. The portions of the alternative panorama image corresponding to the non-overlapping portions 514a, 514b, 514c, may be coded with reference to the panorama image 510, which will result in those portions being encoded as P-skip blocks. As a result, only the ignored image data 522a, 522b, 522c, needs to be encoded.

The additional video frames may be marked as "non-display" frames, or in video decoding standards where "non-display" frames cannot be used, marked with a display count value referring to an earlier or later position in the video stream in order to trick a standard decoder to not display these image frames. A customized decoder would however be instructed to identify these video frames and use them for processing the panorama image, whereas a non-customized decoder could disregard the additional frames. This will be described in more detail in the following.

The encoder 304 forwards the encoded video stream to the transmitter 306 which transmits it in the form of a bitstream to one or more of the client devices 104a, 104b, 104c. The encoded video stream is indicated as item 310 in FIG. 3.

In step S10, a client device 104a, 104b, 104c receives the encoded video stream 310 using receiver 402 and decodes the encoded video stream 310 using the decoder 404.

If the client device is a non-customized client device, the decoder typically implements a standard video decoding scheme, such as H.264 or H.265. When the ignored image data 520 is encoded as described above, a standard decoder of a non-customized client device may simply ignore the ignored image data 520 in the encoded video stream and simply display the panorama image 510 generated by the panorama image generator 302 in the video camera 102.

A customized client device, such as client device 104c, instead has a decoder 404 which identifies the additional information in the video stream, i.e., the image data 520 that was ignored by the video camera 102 when generating the panorama image 500. For example, it may identify additional tiles and/or slices in frames of the video stream, or identify additional video frames being marked as "non-display" frames as described above.

This additional information is then used by the stitching component 406 in order to, for instance, update the panorama image 510. Generally, the stitching component 406 may update the panorama image 510 by blending the panorama image 510 in portions 512a, 512b, 512c, corresponding to overlapping portions 502a, 502b, 502c in the original images A, B, C, D, with image data 522a, 522b, 522c that was ignored when generating these portions 512a, 512b, 512c. Typically, the blending includes calculating a weighted average. By way of example, the stitching component 406 may update portion 512a of the panorama image 510 by calculating a weighted average of image data in portion 512a of the panorama image 510 and image data in portion 522b of the ignored image data 520. Accordingly, image data from original images A and B will be blended in portion 512a of the panorama image 510. Similarly, image data of images B and C are blended in portion 512b, and image data of images C and D are blended in portion 512c.

The weights applied when calculating the weighted average may be selected pixel-wise. For example, the weights may be selected based on proximity to the boundaries of the portion 512a, 512b, 512c. By way of example, for image data originating from image A, the weight may be a function of the closest distance to the portion 514a corresponding to the non-overlapping portion 504a of image A. This is further illustrated in FIG. 6 with respect to blending in portion 512a of the panorama image 510.

Figure 6:
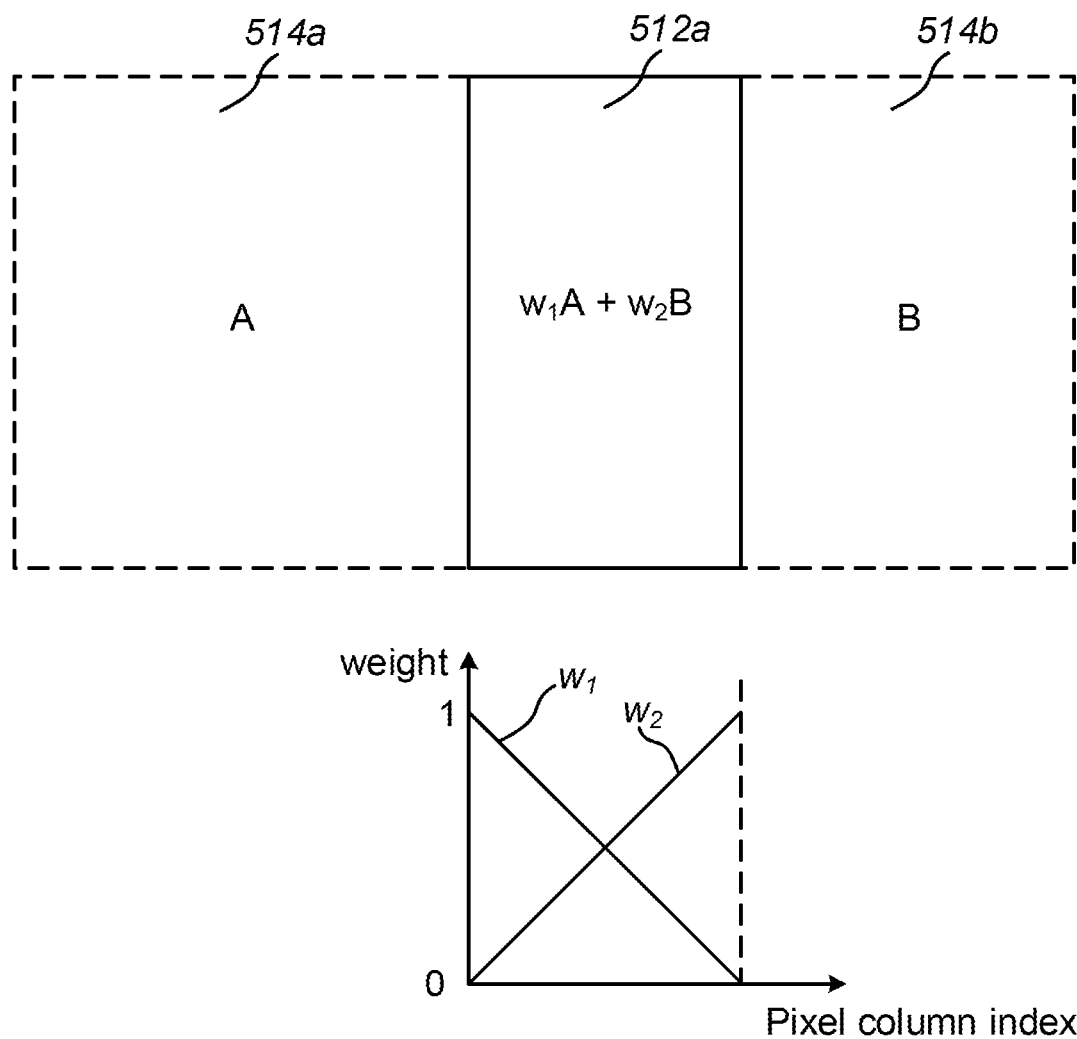
FIG. 6 schematically illustrates selection of weights for calculating a weighted average according to embodiments.

FIG. 6 illustrates portion 512a of the panorama image 510. In this portion a weighted average is formed from image data from images A and B, i.e., $w_1 A + w_2 B$. The weight $w_1$ is a decaying function of distance to the left periphery of the portion 512a, i.e. to the boundary between portion 512a and 514a (corresponding to the non-overlapping part 504a of image A). The weight $w_2$ is instead a decaying function of distance to the right periphery of the portion, i.e. to the boundary between portion 512a and 514b (corresponding to the non-overlapping part 504a of image B). The weights sum to one, thereby giving rise to a weighted average. Here the weights are illustrated as a linear function of distance to the periphery of the portion 512a. However, in practice, the exact form of the function may vary. Preferably, however, it is a smooth function.

According to another embodiment, the weights may not only be selected pixel-wise, but they may also be different depending on spatial frequency. For example, the image data of portion 512a of the panorama image 500 may be separated into low frequency contents and high frequency contents, e.g., by spatially filtering the images using a low-pass filter and a high-pass filter. Similarly, the ignored image data 522a may be separated into low frequency contents and high frequency contents. By low frequencies is generally meant frequencies below a first threshold, and by high frequencies is generally meant frequencies above or equal to a second threshold. The first and the second threshold may be equal. The stitching component 406 may then calculate a first weighted average with respect to the low frequency contents of the image data of portions 512a and 522b, and a second weighted average with respect to high frequency contents of the image data of portions 512a and 522b.

The weights used when calculating the first and the second weighted average may be selected differently. For example, the weights used when calculating the first weighted average may be selected according to what was described above with reference to FIG. 6. The weights used when calculating the second weighted average may be selected to be equal to either zero or one. Thus, for high frequencies no blending takes place. By way of example, again referring to portion 512a of the panorama image 510, the weight $w_1$ applied to high frequency contents of image A may be set to one and the weight $w_2$ applied to high frequency contents of image B may be set to zero for pixels which are closer to the left boundary than to the right boundary of portion 512a. Conversely, the weight $w_1$ applied to high frequency contents of image A may be set to zero and the weight $w_2$ applied to high frequency contents of image B may be set to one for pixels which are closer to the right boundary than to the left boundary of portion 512a.

The weights may also be set to be dependent on the image data in portions 512a, 512b, 512c of the panorama image 510, and on the ignored image data 522a, 522b, 522c. For example, if there is an object or a part of an object which covers one of the overlapping portions 502a, 502b, 502c in the original images A, B, C, D, it may be beneficial to only use image data from one of the overlapping images in the overlapping portion, at least for pixels covered by the object. Due to parallax, there is otherwise a risk that the object may be shown in duplicate in the resulting panorama image. Therefore, the stitching component 406 may identify objects or part of objects in portions 512a, 512b, 512c of the panorama image 500. Similarly, the stitching component 406 may identify objects or parts of objects in the corresponding ignored image data 522a, 522b, 522c. The object identification may, e.g., include identification of edges, corners, or contrast points in the image data as known in the art. If the stitching component 406 identifies an object or part of an object in both a portion 512a, 512b, 512c and in the corresponding piece of ignored image data 522a, 522b, 522c, a weight used when forming the weighted average described above is set to zero for one of the panorama image 510 and the ignored image data 520 for pixels belonging to the object.

When the stitching component 406 has updated the panorama image 510, the updated panorama image may be displayed on a display of the client device.

Although the above description mainly relates to updating a panorama image in order to improve the smoothness of the panorama image, it is to be understood that a customized client device also may use the additionally received data, i.e., the image data that was ignored on the camera side when generating the panorama image. For example, the client device may restore the plurality of images from the panorama image 510 and the ignored image data 520. According to another example, the client device may use the received panorama image 510 and the ignored image data 520 in order to calculate depth information in portions 512a, 512b, 512c corresponding to overlapping portions 502a, 502b, 502c of the original images. The depth information may be calculated based on disparity in the overlap of the images A, B, C, D.

Even if the above method has been described in the context of a video camera that captures the plurality of images concurrently by using a plurality of image sensors having partly overlapping fields of view, it is also applicable to other situations. For example, a video camera with a single image sensor may be moved, e.g., by performing panning and tilting motions, to scan a scene. The video sequence captured by such a video camera thus includes a plurality of images which depicts a scene from slightly different positions and/or directions. The plurality of images will thus correspond to partly overlapping fields of view of the scene. However, in this case the images are not captured concurrently, but rather correspond to video frames of a video sequence being captured at different points in time. The above-described method may be applied mutatis mutandis to a plurality of images being captured in this way. In particular, the method may comprise: the video camera capturing a video sequence comprising a plurality of images having partly overlapping fields of view, the video camera identifying overlapping portions of the plurality of images as portions where at least two images of the plurality of images overlap, the video camera generating, by joining together portions of the plurality of images, a panorama image corresponding to a union of the fields of view of the plurality of images, wherein, for each overlapping portion of the plurality of images, the video camera includes image data from one of the at least two images that overlap in the panorama image, and the video camera ignores image data from the other images among the at least two images that overlap, the video camera encoding the panorama image and the image data that was ignored when generating the panorama image, and transmitting them to the client device in an encoded video stream, the client device receiving and decoding the encoded video stream, and, on a condition that the client device is customized for handling the image data that was ignored by the video camera when generating the panorama image, the client device updating the panorama image in portions corresponding to the overlapping portions of the plurality of images using the image data that was ignored by the video camera when generating the panorama image.

It will be appreciated that a person skilled in the art can modify the above-described embodiments in many ways and still use the advantages of the present teachings as shown in the embodiments above. For example, the disclosed method is equally applicable when more than two images overlap in an overlapping portion. Thus, the present teachings should not be limited to the shown embodiments but should only be defined by the appended claims. Additionally, as the skilled person understands, the shown embodiments may be combined.

What is claimed is:

1. A method performed in a system comprising a video camera and a client device, comprising:
   the video camera capturing a plurality of images concurrently by using a plurality of image sensors having partly overlapping fields of view;
   the video camera identifying overlapping portions of the plurality of images as portions where at least two images of the plurality of images overlap;
   the video camera generating, by joining together portions of the plurality of images, a panorama image corresponding to a union of the fields of view of the plurality of image sensors, wherein, for each overlapping portion of the plurality of images, the video camera includes image data from one of the at least two images that overlap in the panorama image, and the video camera ignores image data from the other images among the at least two images that overlap;
   the video camera encoding the panorama image and the image data that was ignored when generating the panorama image, and transmitting them to the client device in an encoded video stream;
   the client device receiving and decoding the encoded video stream;
   on a condition that the client device is customized for handling the image data that was ignored by the video camera when generating the panorama image, the client device updating the panorama image in portions corresponding to the overlapping portions of the plurality of images using the image data that was ignored by the video camera when generating the panorama image; and
   for each portion of the panorama image that corresponds to an overlapping portion of the plurality of images, the client device updating the panorama image by calculating a weighted average of the panorama image and the image data that was ignored by the video camera for that overlapping portion.

2. The method of claim 1, wherein weights of the weighted average are selected pixel-wise based on a proximity of a pixel to a periphery of the portion of the panorama image that corresponds to an overlapping portion of the plurality of images.

3. The method of claim 2, wherein the weights of the weighted average are a smooth function of the proximity of the pixel to the periphery of the portion of the panorama image that corresponds to an overlapping portion of the plurality of images.

4. The method of claim 1, further comprising:
   for each portion of the panorama image that corresponds to an overlapping portion of the plurality of images:
   the client device calculating a first weighted average of the panorama image and the image data that was ignored by the video camera for that overlapping portion, wherein the first weighted average is calculated with respect to spatial frequencies being lower than a first threshold; and
   the client device calculating a second weighted average of the panorama image and the image data that was ignored by the video camera for that overlapping portion, wherein the second weighted average is calculated with respect to spatial frequencies being equal to or above a second threshold, the second threshold being larger than or equal to the first threshold,
   wherein the panorama image is updated in each portion corresponding to an overlapping portion of the plurality of images by merging the first weighted average and the second weighted average, and
   wherein weights used to calculate the first weighted average and the second weighted average are selected differently.

5. The method of claim 4, wherein the weights of the first weighted average are a smooth function of the proximity to the periphery of the portion of the panorama image that corresponds to the overlapping portion of the plurality of images, and
   wherein the weights of the second weighted average are either zero or one depending on the proximity to the periphery of the portion of the panorama image that corresponds to the overlapping portion of the plurality of images.

6. The method of claim 1, further comprising:
   the client device identifying objects in the portion of the panorama image that corresponds to an overlapping portion of the plurality of images and in the image data that was ignored by the video camera when generating that portion of the panorama image, wherein, if an object is identified in both the portion of the panorama image that corresponds to an overlapping portion of the plurality of images and in the image data that was ignored by the video camera when generating that portion of the panorama image, a weight of one of the panorama image and the image data that was ignored by the video camera when generating that portion is set to zero for pixels identified as belonging to that object.

7. The method of claim 1, further comprising:
   the client device restoring the plurality of images from the panorama image and the image data that was ignored when generating the panorama image.

8. The method of claim 1, further comprising:
   the client device calculating, based on the panorama image and the image data that was ignored by the video camera when generating the panorama image, depth information for portions of the panorama image corresponding to the overlapping portions of the plurality of images.

9. The method of claim 1, further comprising:
   on a condition that the client device is not customized for handling the image data that was ignored by the video camera when generating the panorama image, the client device displaying the panorama image.

10. The method of claim 1, wherein the panorama image is encoded as a video frame marked by a time stamp in the encoded video stream, and wherein the video camera marks the encoded image data that was ignored when generating the panorama image by the same time stamp.

11. The method of claim 10, wherein the image data that was ignored when generating the panorama image is encoded as additional encoding tiles and/or slices in the same video frame as the panorama image.

12. The method of claim 10, wherein the image data that was ignored when generating the panorama image is encoded as one or more separate video frames.

13. The method of claim 12, wherein the one or more separate video frames are marked as non-display frames.

14. A system comprising:
   a video camera comprising a plurality of image sensors having partly overlapping fields of view, the plurality of image sensors being configured to concurrently capture a plurality of images, wherein the video camera is further configured to:
identify overlapping portions of the plurality of images as portions where at least two images of the plurality of images overlap;
generate, by joining together portions of the plurality of images, a panorama image corresponding to a union of the fields of view of the plurality of image sensors, wherein, for each overlapping portion of the plurality of images, the video camera is configured to include image data from one of the at least two images that overlap in the panorama image, and to ignore image data from the other images among the at least two images that overlap; and
encode the panorama image and the image data that was ignored when generating the panorama image, and transmitting them to a client device in a video stream; and
a client device which is configured to receive and decode the video stream, to update the panorama image in portions corresponding to the overlapping portions of the plurality of images using the image data that was ignored by the video camera when generating the panorama image, and, for each portion of the panorama image that corresponds to an overlapping portion of the plurality of images, to update the panorama image by calculating a weighted average of the panorama image and the image data that was ignored by the video camera for that overlapping portion.

* * * * *